United States Patent
Shimizu et al.

(10) Patent No.: US 9,696,334 B2
(45) Date of Patent: Jul. 4, 2017

(54) WHEEL SPEED SENSOR

(71) Applicant: Sumitomo Wiring Systems, Ltd., Yokkaichi, Mie (JP)

(72) Inventors: Moriyuki Shimizu, Mie (JP); Yoshitaka Kuroda, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 97 days.

(21) Appl. No.: 14/843,796

(22) Filed: Sep. 2, 2015

(65) Prior Publication Data

US 2016/0069923 A1 Mar. 10, 2016

(30) Foreign Application Priority Data

Sep. 10, 2014 (JP) ................................ 2014-184290

(51) Int. Cl.
*G01P 3/44* (2006.01)
*G01P 1/02* (2006.01)
*B60T 8/171* (2006.01)

(52) U.S. Cl.
CPC ................ *G01P 3/44* (2013.01); *B60T 8/171* (2013.01); *G01P 1/026* (2013.01)

(58) Field of Classification Search
CPC ......... G01P 1/026; G01P 3/44; G01D 11/245; B60T 8/171; B60T 8/329
See application file for complete search history.

(56) References Cited

U.S. PATENT DOCUMENTS

| | | | | |
|---|---|---|---|---|
| 5,302,934 A | * | 4/1994 | Hart | G01K 7/22 338/22 R |
| 6,788,054 B2 | * | 9/2004 | Collins | G01D 11/245 324/174 |
| 7,589,280 B2 | * | 9/2009 | Nelson | G01D 11/245 174/84 C |
| 9,435,630 B2 | * | 9/2016 | Storrie | G01D 5/145 |
| 2008/0149483 A1 | * | 6/2008 | Robison | G01N 27/407 204/424 |
| 2008/0206107 A1 | * | 8/2008 | Thanigachalam | G01N 27/12 422/94 |
| 2011/0158287 A1 | * | 6/2011 | Clark | G01D 11/245 374/185 |
| 2012/0013329 A1 | * | 1/2012 | Hattori | G01P 1/026 324/207.25 |
| 2014/0230545 A1 | * | 8/2014 | Geer | G01D 11/245 73/431 |
| 2015/0355213 A1 | * | 12/2015 | Kobayashi | G01P 1/026 324/207.25 |

FOREIGN PATENT DOCUMENTS

JP 2008268016 A 11/2008

* cited by examiner

*Primary Examiner* — Freddie Kirkland, III
(74) *Attorney, Agent, or Firm* — Reising Ethington P.C.

(57) ABSTRACT

A wheel speed sensor is provided that makes it possible to suppress unnecessary deformation when crimping a cover. A wheel speed sensor has a sensor head in which a sensor is accommodated, and a tube-shaped metallic cover that covers a portion of the sensor head and protects the sensor head. The cover has multiple protruding pieces on an opening portion, and is fixed against the sensor head by the protruding pieces being crimped toward the sensor head.

4 Claims, 3 Drawing Sheets

WHEEL SPEED SENSOR

This Application claims the benefit of Japanese Application No. JP2014-184290, filed on Sep. 10, 2014, the contents of which are hereby incorporated by reference in their entirety.

FIELD

The present invention relates to a wheel speed sensor for installation in a vehicle.

BACKGROUND

Conventionally, vehicles such as automobiles have been equipped with a wheel speed sensor in order to perform vehicle control in an antilock brake system (ABS), for example. A wheel speed sensor is provided so as to oppose a sensor rotor that rotates along with a wheel, detects an amount of change in magnetic flux caused by rotation of the sensor rotor, and outputs an electrical signal that corresponds to the detection result to a control apparatus installed in the vehicle (e.g., see JP 2008-268016A).

Also, the wheel speed sensor in JP 2008-268016A has a sensor head in which a detection unit (e.g., a Hall IC) is covered by a resin covering that is made of resin, and a cover that is made of metal and covers the periphery of the sensor head, and the sensor head is protected by the cover.

JP 2008-268016A is an example of related art.

As shown in FIG. 3, for example, a wheel speed sensor such as that described above has a crimping portion C2 that is crimped against a sensor head H over the entire circumference of an opening portion C1 of a metal cover C that is shaped as a bottomed cylinder, and this is thought to prevent the cover C from detaching from the sensor head H. However, due to performing crimping over the entire circumference of the opening portion of the cover C, there is a risk of deformation occurring in a portion of the metallic cover other than the crimping portion.

SUMMARY

The present wheel speed sensor has been achieved in order to solve the above-described problems, and an object thereof is to provide a wheel speed sensor in which unnecessary deformation during crimping of the cover can be suppressed.

A wheel speed sensor that solves the above-described problems includes: a sensor head in which a sensor is accommodated; and a tube-shaped metallic cover that covers a portion of the sensor head and protects the sensor head, wherein the cover has a plurality of protruding pieces on an opening portion, and is fixed against the sensor head by the protruding pieces being crimped toward the sensor head.

According to this configuration, the cover is fixed to the sensor head by the protruding pieces being crimped, and therefore less deformation occurs during the crimping of the cover in comparison with the case of performing crimping over the entire circumference of the opening portion, and it is possible to suppress unnecessary deformation of the cover.

In the above-described wheel speed sensor, it is preferable that a bracket for attachment to a vehicle is provided, and the cover is fixed against the sensor head such that the opening portion having the protruding pieces is located on the bracket side.

According to this configuration, the opening portion having the protruding pieces is located on the bracket side, and therefore the cover can be fixed by crimping the protruding pieces at a position separated from the tip of the sensor head rather than at the tip of the sensor head.

In the above-described wheel speed sensor, it may be preferable that the cover has three or four protruding pieces. According to this configuration, three or four protruding pieces are provided, thus making it possible to fix the cover reliably.

With the present wheel speed sensor, it is possible to suppress unnecessary deformation during crimping of the cover.

DRAWINGS

Preferred exemplary embodiments of the invention will hereinafter be described in conjunction with the appended drawings, wherein like designations denote like elements, and wherein.

DESCRIPTION

Hereinafter, an embodiment of a wheel speed sensor will be described.

Figure 1:
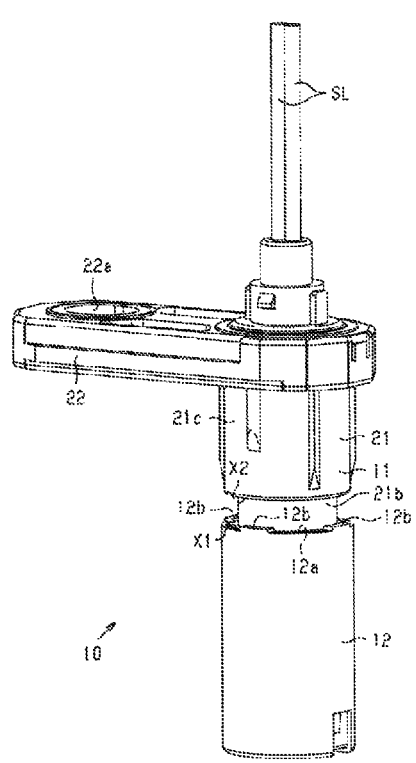
FIG. 1 is a perspective view of a wheel speed sensor according to an embodiment.

As shown in FIG. 1, a wheel speed sensor 10 of the present embodiment has a sensor head 11 and a cover 12 that covers the sensor head 11 and is shaped as a bottomed cylinder. Note that the wheel speed sensor 10 of the present embodiment is attached in the vicinity of a wheel, detects the amount of change in magnetic flux caused by the rotation of a sensor rotor that rotates integrally with the wheel, and outputs an electrical signal that corresponds to the detection result to a control apparatus installed in the vehicle.

The sensor head 11 has an approximately circular column shape, and has a resin covering 21 that is made of resin and accommodates therein a detection unit (not shown) such as a Hall IC. A bracket 22 for attachment to the resin covering 21 is provided on the base side of the sensor head 11, and the sensor head 11 can be attached to the vehicle using a through-hole 22a formed in the bracket 22. Also, a signal line SL is connected to the base side of the sensor head 11, and an electrical signal that corresponds to the detection result of the detection unit in the resin covering 21 is output to the control apparatus.

Figure 2:
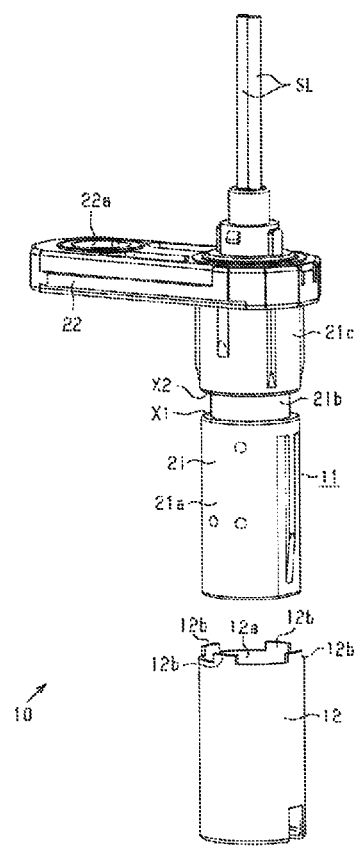
FIG. 2 is a perspective view of the wheel speed sensor of FIG. 1 in a state in which a cover of the wheel speed sensor according to the embodiment has been removed.

As shown in FIG. 2, the resin covering 21 has an approximately circular column shape, and has a first columnar portion 21a, a second columnar portion 21b, and a third columnar portion 21c in the stated order from the tip side to the base side (signal line SL side). The first columnar portion 21a and the third columnar portion 21c have approximately the same diameter, and the second columnar portion 21b is configured to have a shorter diameter than that of the first and third columnar portions 21a and 21c. For this reason, ring-shaped surfaces X1 and X2 that are ring-shaped and have a level difference are respectively provided between the first columnar portion 21a and the second columnar portion 21b and between the second columnar portion 21b and the third columnar portion 21c.

As shown in FIG. 2, the cover 12 is made of metal and has an approximately bottomed cylinder shape. An opening portion 12a of the cover 12 has four protruding pieces 12b that protrude from the end portion of the opening portion 12a in a direction opposite to the bottom portion of the cover 12. The protruding pieces 12b are formed at approximately 90° intervals, and are formed such that the protruding pieces 12b are separated from each other. Also, as shown in FIG. 1, when the cover 12 and the resin covering 21 (sensor head 11) are assembled together, the protruding pieces 12b are crimped toward the second columnar portion 21b so as to fix the cover 12 to the sensor head 11.

Next, operation of the wheel speed sensor of the present embodiment will be described.

The wheel speed sensor 10 of the present embodiment is fixed to a support member (not shown) in the vicinity of a wheel by inserting a bolt into the through-hole 22a of the bracket 22 and screwing it to the support member. The wheel speed sensor 10 detects the amount of change in magnetic flux that changes according to the rotation of the sensor rotor that rotates integrally with the wheel, and outputs an electrical signal that corresponds to the detection result to the control apparatus installed in the vehicle.

Here, the resin covering 21 of the sensor head 11 of the wheel speed sensor 10 is covered by the metallic cover 12, thus suppressing loss of the resin covering 21. Also, the cover 12 is provided with the opening portion 12a that is positioned on the base side (bracket side) of the sensor head 11, and is crimp-fixed to the sensor head 11 by the protruding pieces 12b while keeping a gap between them, thus suppressing deformation of the cover 12 during the crimping.

Next, effects of the present embodiment will be described.

Since the cover 12 is fixed to the sensor head 11 by the protruding pieces 12b being crimped, less deformation occurs during the crimping of the cover 12 in comparison with the case of performing crimping over the entire circumference of the opening portion, and it is possible to suppress unnecessary deformation of the cover 12

Figure 3:
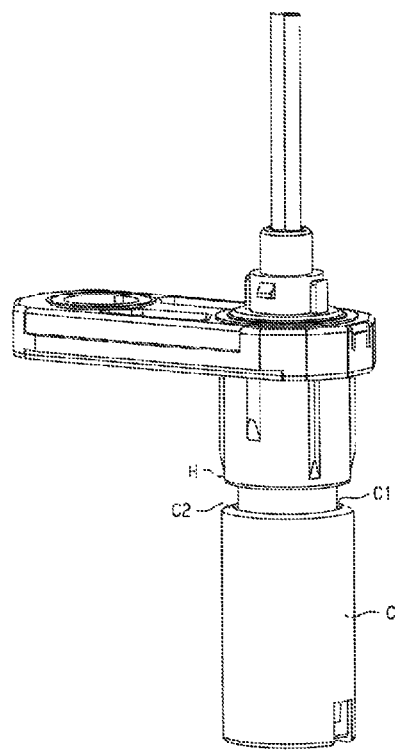
FIG. 3 is a perspective view of a wheel speed sensor according to a reference example.

Also, when the wheel speed sensor 10 is attached, there are cases in which, for example, the sensor head 11 and the cover 12 are inserted through an attachment hole in the support member provided on the vehicle side. In this case, when the protruding pieces 12b are crimped for fixing to the sensor head 11, the cover 12 may somewhat undergo a small amount of deformation due to the crimping. However, if the entire circumference of the opening portion C1 of the cover C is crimped as shown in FIG. 3, the amount of deformation of the cover 12 is large, and it becomes difficult to insert the cover through the attachment hole (not shown) provided on the vehicle side in order to attach the wheel speed sensor 10. However, by employing a configuration in which only four protruding pieces 12b for crimping are provided on the opening portion 12a of the cover 12, as in the present embodiment, the amount of deformation of the cover 12 is suppressed, and the ease of insertion through the attachment hole is improved.

By providing four protruding pieces 12b, the cover 12 can be fixed reliably. Note that the above-described embodiment may be modified as follows.

Although the cover 12 is configured having four protruding pieces 12b in the above embodiment, there is no limitation to this. For example, a configuration having three protruding pieces 12b may be employed. In this case, it is preferable that the protruding pieces 12b are formed on the cover 12 at approximately 120° intervals in the circumference direction. Also, the number of protruding pieces 12b may be modified as necessary as long as they are provided in the state of being separated from each other.

Although the cover 12 has a bottomed cylinder shape in the above embodiment, it may be configured as a cylinder that has no bottom portion, that is to say is open at the two ends.

Also, the cover 12 may be shaped as a polygonal tube instead of being a circular cylinder. In this case, it is preferable that the cover 12 has a shape that conforms to the sensor head 11.

Although a configuration in which the wheel speed sensor 10 is used as an ABS sensor is described in the above embodiment, the application thereof is not limited to this.

The above embodiment and the modified examples may be combined as necessary.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wheel speed sensor
11 Sensor head
12 Cover
12a Opening portion
12b Protruding piece
22 Bracket

The invention claimed is:
1. A wheel speed sensor, comprising:
a sensor head in which a sensor is accommodated, the sensor head is at least partially covered with a resin covering and includes first and second portions, the second portion has a smaller diameter than the first portion so that a ring-shaped surface is formed between the first and second portions; and
a tube-shaped metallic cover that covers the first portion of the sensor head and protects the sensor head, the metallic cover is a separate component from the sensor head and includes an opening portion that is configured to slip over the first portion of the sensor head;
wherein the metallic cover has a plurality of protruding pieces on the opening portion, and the metallic cover is fixed against the sensor head by the protruding pieces being crimped inwardly toward the ring-shaped surface of the sensor head.

2. The wheel speed sensor according to claim 1, wherein a bracket for attachment to a vehicle is provided; and
the cover is fixed against the sensor head such that the opening portion having the protruding pieces is located on the bracket side.

3. The wheel speed sensor according to claim 1, wherein the cover has three or four protruding pieces.

4. The wheel speed sensor according to claim 2, wherein the cover has three or four protruding pieces.

* * * * *